(No Model.)
L. ZWILLINGER.
PROCESS OF AND APPARATUS FOR MAKING CHARCOAL.
No. 466,265. Patented Dec. 29, 1891.
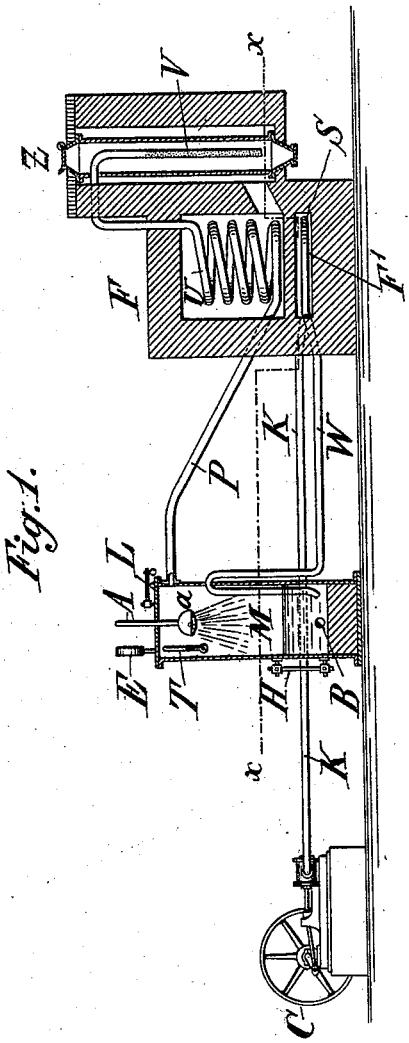
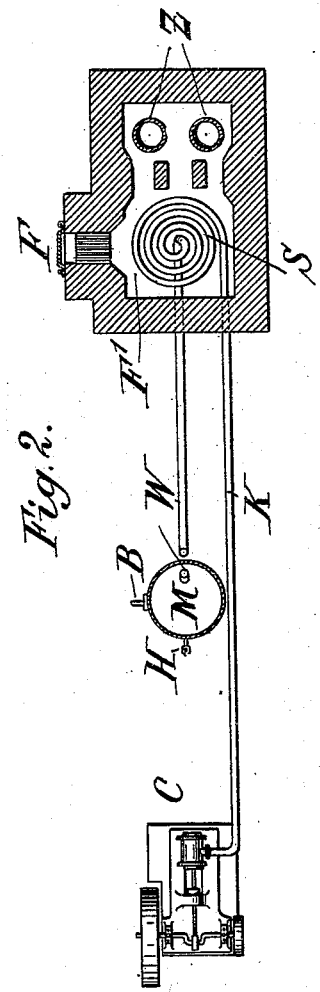
Witnesses.
Inventor
Leopold Zwillinger

UNITED STATES PATENT OFFICE.

LEOPOLD ZWILLINGER, OF VIENNA, AUSTRIA-HUNGARY.

PROCESS OF AND APPARATUS FOR MAKING CHARCOAL.

SPECIFICATION forming part of Letters Patent No. 466,265, dated December 29, 1891.

Application filed August 16, 1890. Serial No. 362,193. (No model.) Patented in Germany September 12, 1889, No. 53,776; in France November 23, 1889, No. 202,146; in Belgium November 23, 1889, No. 88,573, and in Austria-Hungary December 30, 1889, No. 39,472 and No. 64,077.

*To all whom it may concern:*

Be it known that I, LEOPOLD ZWILLINGER, a subject of the Emperor of Austria, residing at Vienna, in the Province of Lower Austria, in the Empire of Austria-Hungary, have invented certain new and useful Improvements in the Process of and Apparatus for Making Charcoal, (for which I have obtained Letters Patent in Austria-Hungary, dated December 30, 1889, No. 39,472 and No. 64,077; in Germany, dated September 12, 1889, No. 53,776; in France, dated November 23, 1889, No. 202,146, and in Belgium, dated November 23, 1889, No. 88,573;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the manufacture of charcoal and the extraction from the material treated of such by-products as acetic acid, methyl alcohol, tar ammonia, and combustible gas.

In the manufacture of charcoal or retort-coal as heretofore conducted the material to be charred or converted into charcoal was charged into retorts and the latter heated to such a degree as to char the contents, the volatile products being conducted away, condensed, and otherwise treated for the purpose of obtaining certain constituent elements, such as ammonia or acetic acid, methyl alcohol, &c. In this process the volatile and condensable products evolved undergo decomposition by reason of their protracted contact with the comparatively highly-heated retort-walls, which are often heated to a bright cherry red, and by their prolonged contact with the material to be charged, which is frequently in an incandescent state. This decomposition of the volatile products greatly reduces the percentage of by-products such as those referred to. To avoid this it has been proposed to introduce steam into the retorts during the process of charring, or gases rich in carbonic oxide—as, for instance, water-gas—and in such manner that the current of steam or gas will carry along and out of the retort the said volatile products evolved from the material treated to avoid any prolonged contact of such products with the hot retort-walls or with the incandescent material. The use of steam, which is readily condensed, has the disadvantage of being retained by the material in the retort under the action of surface attraction—that is to say, the flow of the steam through the material and retort is more or less checked. The steam does, therefore, not accomplish the results aimed at to the extent necessary to the recovery of a large percentage of the by-products, to which end it is of the greatest importance that the volatile and condensable products evolved from the material being charred should be carried out of the retort as rapidly as possible, if not as rapidly as evolved, in order to prevent their decomposition. The use of a gas less condensable than steam and rich in carbonic oxide and poor in oxygen has the disadvantage of requiring expensive special apparatus for its manufacture. In either of the processes above referred to the exclusion from the retorts of atmospheric air is an essential condition.

This invention has for its object to provide a mode or process of and means for charring organic substances, such as peat, wood, vinasse, brown or cannel coal, and other organic substance or substances of organic origin, that will be free from the disadvantages referred to hereinabove and whereby an increased percentage of by-products and a better article of charcoal or retort-coal are obtained; and to these ends the invention consists in the process of and apparatus for manufacturing retort-coal, as will now be fully described, reference being had to the accompanying drawings, in which—

Figure 1 is a longitudinal vertical section, and Fig. 2 a longitudinal horizontal section on or about on line *x x* of Fig. 1, of an apparatus embodying part of my invention.

I have stated above that the exclusion of atmospheric air from the retorts in which the material is charred is an essential requisite to the obtaining of a good product, in fact to the obtaining of any charcoal at all, since the admission of atmospheric air to the retorts would result in the combustion of the material to be charred when this is carried on as above set forth.

In my novel process I avail myself of atmospheric air for the purpose of more rapidly removing the volatile products evolved from the material in the retorts in conjunction with steam, in that the flow of the latter through the retort is materially, in fact greatly, accelerated.

To prevent combustion by the admission of atmospheric air to the retorts, I first deprive the air of a large percentage, if not of all, of its oxygen, thereby obtaining a gas rich in nitrogen, and this I attain by treating the air as hereinafter described and combine the same with steam, so that the latter may be caused to rapidly flow through the material in and through the retort, entraining the volatile products evolved from said material—namely, the products of distillation. This rapid flow of the steam will be readily understood when it is borne in mind that the air is saturated with the steam, hence intimately combined therewith, and thus serves as a vehicle to carry the steam through the retorts. On the other hand, the action of the saturated air upon the material promotes the formation of acetic acid, methyl alcohol, and ammonia, and in the formation of this latter the nitrogen contained in the air has an especially good effect.

It is well known that when atmospheric air is repeatedly passed through water a portion of the oxygen and nitrogen in the air is taken up by the water—that is to say, dissolved—the relative proportions of oxygen and nitrogen "dissolved out," if I may so term it, are about as thirty-five (35) is to sixty-five (65,) the air becoming saturated with water. Since atmospheric air contains about seventy-nine (79) percentum of nitrogen and twenty-one (21) percentum of oxygen, its original composition is necessarily destroyed when repeatedly passed through water, the proportion of oxygen being greatly reduced, leaving a gas or gaseous compound that is very rich in nitrogen. One cubic meter of water under normal pressure and at a temperature of about 32° centigrade will dissolve or take up about 17.14 liters of air containing 11.18 liters of nitrogen and 5.96 liters of oxygen, and when repeatedly passed through water the air will contain in a given volume only seven (7) parts of oxygen to ninety-three (93) parts of nitrogen. Besides this, the air is also saturated with water—for instance, one (1) cubic meter of saturated air will contain about 251.3 grams of water and 475.1 grams (or 0.48634 of a cubic meter) of dry air, so that the real percentage of oxygen is still further reduced. When such air is caused to flow through the material in and through the retorts, instead of promoting combustion it will have the contrary effect—namely, it will promote the charring of the material, and will, furthermore, flow much more rapidly through said material and the retorts than steam.

A long series of experiments with various organic substances have demonstrated that far more satisfactory results are obtained when air partly deprived of its oxygen and saturated with water is passed through the retorts than when steam alone is used. I have in these experiments further discovered that still better results are obtained when the saturated air is superheated before its admission to the retort, the percentage of by-products being greatly increased thereby, and a much better charcoal is obtained and the expensive use of a gas rich in carbonic oxide is avoided.

Referring now to the drawings, C indicates an air-pump the exhaust-port of which is connected by a pipe K with a heating-coil S, wherein the air is heated to about 90° centigrade. The heated air passes from coil S through pipe W into a water-reservoir M, said pipe being bent so that its discharge-orifice will be close to the bottom of said reservoir. As shown, the reservoir M is provided with a level-indicator H, a thermometer T, a manometer E, and safety-valve L, the water being supplied to the reservoir through a pipe A, that is preferably provided with a rose-head a, so as to supply the water to the reservoir in a subdivided condition to cause its more rapid absorption by the air. It is not absolutely necessary to heat the air before saturating the same in the water; but it is obvious that by preheating the air it will be in a better condition to absorb moisture than would be the case if such air were fed to the reservoir at a normal temperature. On the other hand, the air will be expanded by heating it, and will thus absorb or take up a greater quantity of water and will also more readily yield up its oxygen. In practice I keep the mixing vessel or reservoir M about one-third full of water and so regulate the supply and exhaust through pipes A B, respectively, as to maintain the water in the reservoir at a substantially constant level. The atmospheric air, partially deprived of its oxygen and substantially saturated with water, having absorbed from two hundred and seventy to two hundred and ninety-five grams of water per cubic meter, flows through the pipe P to a superheating-coil U, arranged in a chamber F of the structure that contains the retort or retorts, F' being the grate and Z Z the retorts, of which I have shown two only, though a greater number of these may be employed, as will be readily comprehended. The superheater-coil U is connected with a pipe V, that has suitable branches extending into the retorts near to the bottom, the major portion of the pipe within the retort being perforated, so as to distribute the superheated air and steam throughout the material. The retorts are connected in any well-known manner with a condenser or condensers. (Not shown in the drawings.) The air on passing through the superheater U is heated to from 320° to 400° centigrade, the moisture absorbed thereby being converted into steam and the air, rich in steam and nitrogen and poor in oxygen, chars the contents of the retorts with the assistance of the fuel on the grate and the heat radiated from the heater-coil. In fact, the heat supplied by the superheated steam and the air admitted to the retort, together with the heat radiated from the coils S and U, will in a very short time sufficiently heat the inclosing brickwork and the retorts contained therein as to char the contents of the retorts.

In order to maintain the air in the reservoir at an approximately constant temperature of 90° centigrade, I so regulate the supply and exhaust of the water as that about one hundred and seventy liters of water will pass to and from the reservoir per minute.

In an apparatus constructed and operated as above described, a retort charge of from eight hundred to twelve hundred kilos can be charred in from five to six hours. The condensable products of combustion are condensed in the usual manner, the combustible fixed gases being utilized as a heating medium for the apparatus, or are otherwise utilized. For each charge of organic material of about eight hundred kilos from forty to forty-two cubic meters of saturated air is required during the time necessary to char the charge. During the process of charring a considerable amount of water is evaporated from the organic manner, as is well known, the removal of which, when steam alone is used, is very difficult and materially tends to retard the flow of such steam and the products of distillation through and out of the retorts. By superheating the moisture-laden air, thus converting the moisture into superheated steam, the air and steam will both take up, if not all, at least the greatest portion of, the moisture contained in the organic matter in the retort and evaporated during the process of charring, which is an important feature of my invention.

The advantages of my novel process of charring organic matter will be readily seen from the fact that by actual practical experiments I have obtained from one hundred kilos of beech-wood from fifty to fifty-five kilos of wood acid, composed of 5.8 kilos of acetic acid ($C_2H_4O_2$) of a strength of about ninety-five per cent. and of 2.2 kilos of wood spirit of a strength of about ninety-three per cent. and containing about seventy-two per cent. of methyl alcohol ($CH_4O_2$) and twenty-eight per cent. of acetone ($CH_3,2CO$.) By the ordinary process, where steam alone is used, the by-products consist of wood acid diluted to the weight of from eighty-five to one hundred kilos, the quantity of acetic acid being only 5.2 kilos of a strength of about eighty-five per cent., while that of wood-spirit is only 1.8 kilos of a strength of about ninety per cent., including the acetone. The increase in the by-products obtained by my process and a corresponding increase in the yield of ammonia are due to the combined action of the steam and air, the latter containing so small a portion of oxygen as not to produce, and much less support, combustion, the percentage of CO and H in the gases being in fact increased, and these in the nascent state form with the vapors evolved in the process of charring compounds, more especially monatomic carbon compounds, which promote the production of acetic acid and wood-spirit. Besides this, the action of the nitrogen, of which there is a comparatively large percentage present, upon the steam and organic matter tends to increase the yield in ammonia very materially.

It will of course be understood that the superheating of the moisture-laden air is not absolutely necessary, though such air should be sufficiently heated to convert the moisture into steam, and although very good results are obtained, yet I prefer to superheat the air and steam for the purposes fully explained hereinabove. On the other hand, air deprived of most of its oxygen by other means may be combined with steam before the admission to the retort.

Having now described my invention, what I claim, and desire to secure by Letters Patent, is—

1. In the manufacture of charcoal, the improvement which consists in placing the material to be charred in a retort, applying heat to said retort, and passing moisture-laden air deprived of the major portion of its oxygen through the material in the retort, for the purpose set forth.

2. In the manufacture of charcoal, the improvement which consists in placing the material to be charred in a retort, applying heat to said retort, and passing hot air deprived of the major portion of its oxygen and combined with steam through the material in said retort, for the purpose set forth.

3. In the manufacture of charcoal, the improvement which consists in placing the material in a retort, and means substantially such as described for heating the same, applying heat to the latter, and passing through the material in the retort superheated air substantially free from oxygen and combined with steam by first passing the air through water for the purpose of eliminating the oxygen and combining the air with moisture, and then superheating the moisture-laden air, for the purpose set forth.

4. In an apparatus for charring organic matter or matter of organic origin, the combination, with a retort and means substantially such as described for heating the same, of an air-forcing apparatus, a closed vessel connected with said apparatus near the bottom thereof and provided with feed and exhaust ports, said feed-ports being connected with a source of water supply, and a conduit connected with the vessel near its upper end, said conduit extending into the retort to near the bottom thereof, substantially as and for the purposes set forth.

5. In an apparatus for charring organic matter or matter of organic origin, the combination, with a retort and means substantially such as described for heating the same, of an air-forcing apparatus, a closed vessel, a heating-coil, and a connection between said coil and the exhaust or forcing port of the forcing apparatus and with the closed vessel near the bottom thereof, said vessel being provided with feed and exhaust ports, the feed-port being connected with a source of water-supply, a spraying device arranged within the closed vessel and connected with the feed-port thereof, and a conduit connected with said closed vessel near its upper end and having a perforated portion that extends into the retort to near the bottom thereof, substantially as and for the purpose set forth.

6. In an apparatus for charring organic matter or matter of organic origin, the combination, with a retort and means substantially such as described for heating the same, of an air-forcing apparatus, a closed vessel, a heating-coil, and a connection between said coil and the exhaust or forcing port of the forcing apparatus and with the closed vessel near the bottom thereof, said vessel being provided with feed and exhaust ports, the feed-port being connected with a source of water-supply, a spraying device arranged within the closed vessel and connected with the feed-port thereof, a conduit connected with said closed vessel near its upper end and having a perforated portion that extends into the retort to near the bottom thereof, and a superheating-coil interposed in said conduit, substantially as and for the purpose specified.

In testimony whereof I affix my signature in presence of two witnesses.

LEOPOLD ZWILLINGER.

Witnesses:
NETTIE S. HARRIS,
W. B. MURPHY.